United States Patent
Seiler et al.

(10) Patent No.: US 11,298,778 B2
(45) Date of Patent: Apr. 12, 2022

(54) SUCTION DEVICE, LASER PROCESSING MACHINE, AND METHOD FOR SUCTIONING

(71) Applicant: Bystronic Laser AG, Niederönz (CH)

(72) Inventors: Thomas Seiler, Uetendorf (CH); Christian Flückiger, Leimiswil (CH)

(73) Assignee: Bystronic Laser AG, Niederönz (CH)

( * ) Notice: Subject to any disclaimer, the term of this patent is extended or adjusted under 35 U.S.C. 154(b) by 0 days.

(21) Appl. No.: 17/263,086

(22) PCT Filed: Jul. 25, 2019

(86) PCT No.: PCT/EP2019/000231
§ 371 (c)(1),
(2) Date: Jan. 25, 2021

(87) PCT Pub. No.: WO2020/020482
PCT Pub. Date: Jan. 30, 2020

(65) Prior Publication Data
US 2021/0260697 A1    Aug. 26, 2021

(30) Foreign Application Priority Data
Jul. 26, 2018    (DE) .......................... 102018118077.2

(51) Int. Cl.
*B23K 26/12* (2014.01)
*B23K 26/70* (2014.01)
(Continued)

(52) U.S. Cl.
CPC ...... *B23K 26/1224* (2015.10); *B23K 26/0869* (2013.01); *B23K 26/38* (2013.01); *B23K 26/702* (2015.10)

(58) Field of Classification Search
CPC .............. F24F 2110/50; F24F 2110/00; B23K 26/1224; B23K 26/702; B23K 26/0869
(Continued)

(56) References Cited

U.S. PATENT DOCUMENTS 4,063,059 A * 12/1977 Brolund ................ B08B 15/002
219/68
4,315,133 A * 2/1982 Morgan ............. B23K 26/1488
219/121.84
(Continued)

FOREIGN PATENT DOCUMENTS

| | | |
|---|---|---|
| CN | 103170741 A | 6/2013 |
| EP | 3213859 A1 | 3/2016 |
| WO | WO2013178281 A1 | 12/2013 |

OTHER PUBLICATIONS

English Langauge Translation of EP3213859A1.
(Continued)

*Primary Examiner* — Jimmy Chou
(74) *Attorney, Agent, or Firm* — Jacob Eisenberg

(57) ABSTRACT

The present disclosure relates to a suction device configured for a laser processing machine with a laser processing head which can be moved over a workpiece holder, with a fan and several flaps which are to be opened selectively to generate an air flow and which are in communication with the fan, and with a control configured to detect the position and operating state of the laser processing head and to control the flaps as a function of the detected position and the operating state of the laser processing head.

8 Claims, 2 Drawing Sheets

(51) Int. Cl.
  *B23K 26/08* (2014.01)
  *B23K 26/38* (2014.01)
(58) Field of Classification Search
  USPC .............. 219/121.6, 121.61, 121.62, 121.63,
     219/121.64, 121.65, 121.66, 121.67,
     219/121.68, 121.69, 121.76, 121.81,
     219/121.83
  See application file for complete search history.

(56) References Cited

U.S. PATENT DOCUMENTS

| | | | | |
|---|---|---|---|---|
| 4,726,824 | A * | 2/1988 | Staten .................... | F24F 3/16<br>96/417 |
| 5,049,723 | A * | 9/1991 | Macdonald .......... | B23K 9/0956<br>219/121.83 |
| 6,165,410 | A * | 12/2000 | Crees .................... | B23K 7/002<br>266/48 |
| 6,664,495 | B2 * | 12/2003 | Yamaguchi ............ | B23K 37/08<br>219/121.39 |
| 7,560,064 | B1 * | 7/2009 | Crees .................... | B23K 7/002<br>266/48 |
| 7,674,998 | B2 * | 3/2010 | Ohnishi ................. | B23K 9/325<br>219/121.39 |
| 7,985,369 | B2 * | 7/2011 | Crees .................... | B08B 15/00<br>266/49 |
| 8,089,024 | B2 * | 1/2012 | Forlong .................. | B23K 7/10<br>219/121.39 |
| 9,000,321 | B2 * | 4/2015 | Yamaguchi .............. | B23K 7/10<br>219/68 |
| 10,406,632 | B2 * | 9/2019 | Maruyama ............. | B23K 26/21 |
| 10,420,200 | B2 * | 9/2019 | Lambert .................. | H05H 1/42 |
| 2003/0080096 | A1 * | 5/2003 | Yamaguchi ........ | B23K 37/0461<br>219/121.39 |
| 2003/0226675 | A1 * | 12/2003 | Osborn ................ | H05K 7/2019<br>174/17 VA |
| 2004/0029521 | A1 * | 2/2004 | Cauthorne .............. | F24F 8/192<br>454/229 |
| 2004/0253918 | A1 * | 12/2004 | Ezell ........................ | F24F 11/30<br>454/239 |
| 2008/0015794 | A1 * | 1/2008 | Eiler ........................ | F24F 3/16<br>702/33 |
| 2008/0066596 | A1 * | 3/2008 | Yamaguchi .......... | B23K 26/702<br>83/34 |
| 2008/0207109 | A1 * | 8/2008 | Bagwell .................. | F24F 11/30<br>454/237 |
| 2016/0067779 | A1 * | 3/2016 | Dautova ................ | B29C 64/153<br>419/7 |
| 2017/0235293 | A1 | 8/2017 | Shapiro et al. | |
| 2017/0252864 | A1 * | 9/2017 | Oberholzer ............. | B08B 15/04 |

OTHER PUBLICATIONS

English Langauge Translation of CN103170741A.
International Preliminary Report on Patentability for PCT/EP2019/000231.

* cited by examiner

SUCTION DEVICE, LASER PROCESSING MACHINE, AND METHOD FOR SUCTIONING

CROSS REFERENCE TO RELATED APPLICATIONS

This application is a national phase application of International Application No. PCT/EP2019/000231, filed 25 Jul. 2019 and further claims priority to German Patent Application DE 10 2018 118 077.2, filed on 26 Jul. 2018, the content of both of which are herein incorporated by reference.

BACKGROUND OF THE INVENTION

The present disclosure relates to a suction device configured for a laser processing machine, a laser processing machine, and a method for suctioning air in a laser processing machine. In particular, the invention relates to a suction device configured for a laser processing machine according to claim 1, a laser processing machine according to claim 7, and a method for suctioning air in a laser processing machine according to claim 13.

A machine tool is used for producing and processing workpieces using tools. In particular, laser processing machines—in particular, for laser cutting and laser welding—in which a laser with a bridge can be moved over a workpiece, are regarded as machine tools.

With increasing laser power and higher cutting speed, the contamination of the interior and of the cut workpieces increases significantly. In addition, the contamination can also lead to premature failures of machine components. The contamination occurs during material separating processes by means of laser beam and cutting gases and is generally referred to as "laser dust," which is generally suctioned off within the machine by means of a central suction.

For economic and also ecological reasons, it is necessary for the suction power to be minimized. For example, five flaps—in the case of larger installations, correspondingly even more flaps—are actuated alternately for this purpose. Currently, it is customary to keep at least one and at most two flaps open or closed as a function of the bridge position.

Laser cutting machines produce gaseous and dusty waste products due to the cutting process. These are generated from the cutting gap created by the laser beam in the material to be cut. The waste products are discharged out of the cutting chamber by a directed air flow; ideally, the maximum flow velocity is located in the respective area of the cutting head. There, where the waste products arise as a result of the cutting process.

US 2008/0 066 596 A1 and WO 2013/178281 A1 disclose a laser processing machine in which the control of the flaps only depends on the detected position of the laser processing head.

US 2017/252864 A discloses a laser processing machine in which the air supply travels with the bridge. This is a complex design.

EP 3 213 859 A1 discloses a laser processing machine in which a fluid supply device can be moved with the laser processing head. This is a complex design.

CN 103170741 A discloses a laser processing machine in which a valve in the air suction is controlled as a function of the bridge position. This suction may not be sufficient—particularly in the case of large installations.

BRIEF SUMMARY OF THE INVENTION

The aim underlying the present disclosure, then, is to avoid the disadvantages of the prior art and to provide an improved suction device. Alternative aims are to provide an improved laser processing machine or an improved method for suctioning.

This aim is achieved by a suction device according to claim 1, a laser processing machine according to claim 7, or a method for suctioning according to claim 13.

The suction device according to the invention configured for a laser processing machine with a laser processing head which can be moved over a workpiece holder comprises a fan and several flaps which are to be opened selectively to generate an air flow and which are in communication with the fan, and a control configured to detect the position and the operating state of the laser processing head and to control the flaps as a function of the detected position and the operating state of the laser processing head, the control is further configured to determine a future position and the operating state of the laser processing head corresponding to this position on the basis of a processing plan.

The control thus has a predictive view via the reference to the processing or cutting plan. It is thereby known via this reference when and where the workpiece is processed. At least, it is known whether the system cuts or positions, and thus does not open the flaps during positioning. The laser processing head can move to other parts of the sheet metal again and again within the cutting plan in order to cut. This leads to a minimized thermal influence on the cut material. If the laser processing head or the bridge receives the command to move, the target position is known. The ventilation flap in the corresponding sector is ideally opened as soon as the command to move the bridge has been issued. The flow then begins to build up. As soon as the bridge has reached the SET position, the cutting process begins. This gives the build up of the flow a time advantage over known methods. There, the flap is opened when the bridge (and thus the cutting head) is at the corresponding position.

This improves removal of gaseous and dusty waste products. These distribute less in the cutting chamber and can be discharged or fed to the optional cleaning filters more efficiently and in a more targeted manner. The processing time of the sheet metal is not disadvantageously extended by, for example, switching on the laser later at the cutting location. It is possible to start the build-up of the air flow or flow field at a certain location before the laser starts the cutting work at this location and before the waste accumulates.

Experiments have shown that the build-up of a flow field in the cutting chamber is subject to a certain inertia. It is suggested, for example, to open a flap of the extraction system in advance so that a corresponding flow occurs in the cutting chamber at the latest at the time of cutting and not only after a few seconds after the start of cutting. This optimizes the removal of the waste products and avoids a disadvantageous distribution in the cutting chamber.

A further advantage is the fact that the cutting chamber is freed from harmful substances earlier due to the improved detection. In one version, it is conceivable to measure the concentration of harmful substances in the cutting chamber using suitable sensors. This could mean that the access doors can only be opened for the operator when the load is not critical. It is also conceivable to use sensors to control the extraction power and, for example, to adapt it to the laser power. This reduces the energy consumption of the extraction or suction system.

The suction device according to the invention proposes an optimization to the effect that, now, the suction flaps are not opened or closed as before solely on the basis of the bridge position, but via an intelligent flap control. With the increasingly optimized laser cutting, the lowest possible heating of the metal sheet, and thus minimal warpage, are guaranteed. This means that the metal sheet is no longer cut continuously from one end to the other but is machined in a distributed manner across the entire workpiece. The suction device according to the invention can be used optimally for such processing. The suction flow is thus selectively conducted within a processing space to the respective processing point. The suction flow is used for suctioning off particulate-laden air or gas, such as smoke. The fan can operate by pull or by push. The control may be a dedicated control or may be implemented in a machine control of the laser processing machine.

The suction device according to the invention has the advantage that the suction flow in the laser processing machine is optimized, and the contamination of the machine in general, as well as the contamination of the workpieces, are thus minimized. Less contamination in the laser processing machine also means a longer service life of the machine components.

It may be provided that the control be configured to open the flaps during a processing operating state of the laser processing head and to close the flaps during a positioning operating state of the laser processing head. During the positioning, i.e., a moving of the bridge or the head without processing, i.e., without activating the laser for processing, the flaps remain closed, whereby the air flow can be adjusted more specifically. It is thus possible to prevent various flaps from being opened and closed again, without having to suction there. During a processing operating state, the laser is activated or switched on, and the laser processing head is moved—possibly at the same time—in order to cut contours, for example.

It can also be provided that the control be configured to already open flaps, before the start of the processing operating state, in the region of the processing to then be carried out and/or to keep flaps open, even after the processing operating state has ended, in the region of the processing carried out. By opening one or more flaps before the start of processing, e.g., before piercing or cutting, the respective flap is already opened, and an optimum air flow or a necessary volume flow can already build up towards the suction point. This leads to a faster evacuation of the contaminated air, and the contamination cannot spread in the first place. The inertia during the flow build-up can thereby be counteracted, and a delay-free suctioning can take place. When the bridge leaves a flap zone, the last flap still remains open until the smoke is suctioned off. The contaminated air is completely suctioned off as a result. These leading and trailing flap-opening times, before and after processing, can be individually adjustable, e.g., on the basis of the materials to be machined, material thicknesses, cutting parameters, etc.

It may be provided that the control be configured to determine a future position of the laser processing head on the basis of the current and/or past movement of the laser processing head. The movement may be known from the control or be measured via sensor technology. The future position can then be predicted.

It can furthermore be provided that the processing plan is a cutting plan. The control thus has a predictive view via the reference to the cutting plan.

In another design it is conceivable that the bridge position is calculated in advance. This means that the flap is opened before the laser processing head receives the command to move. This allows the time interval between flap opening and cutting start to be further increased. Furthermore, in this procedure the time interval between flap opening and cutting start is independent of the dynamics achieved by the bridge.

It may be provided that the control be configured to control a suction volume of the fan as a function of the operating state. The energy consumption of the suction device can be reduced by means of the variable suction volume—especially, in combination with contamination sensors.

A laser processing machine according to the invention—in particular, a laser cutting machine—with a laser processing head—in particular, a laser cutting head—which can be moved in a processing space over a workpiece, provides a processing space configured to receive a workpiece to be machined and a suction device as described above. The same advantages and modifications apply as described above. For example, fine dust sensors or visibility sensors can be used as sensors.

It may be provided for at least one sensor to be provided for detecting the contamination of the air in the processing space and for the control to be configured to use sensor data of the sensor for controlling the flaps. Optionally, the contamination may be measured by means of sensors, e.g., in $\mu m/m^3$, and further conclusions can thereby be drawn about the flap control. For example, the duration and/or intensity of the suction air flow may be adjusted—for example, via the flap control and/or fan power. Regions of the processing space or the entire processing space can be monitored.

It may also be provided that the control be configured to control an opening of a protection door of the processing space as a function of the sensor data. The contamination sensors can, for example, also provide information about the fine dust load in the machine interior and thus possibly delay the opening of the protection gate until the air load has fallen below a hazardous concentration.

It may be provided that the control be configured to use the sensor data for determining a maintenance state of the laser processing machine. These sensors could also be used for further applications, e.g., for predictive maintenance (for example, filter addition), for checking the cutting parameters/quality, material quality, etc., and thus provide even further additional uses.

It may also be provided that the control be configured to control a suction volume of the fan as a function of the sensor data. The energy consumption of the suction device can thus be reduced by means of the variable suction volume, which is based upon the data from contamination sensors.

It may be provided that flaps be arranged in a lower region of the processing space, in an upper region, and/or in a central region. An air flow for suctioning is built up between a controlled flap and a further controlled flap, uncontrolled flap, or a simple opening—for example, a labyrinth opening. At least one controlled flap is then present in the air flow. The flaps can be arranged in said regions in order to set an optimum air flow, depending upon the machine or processing scenario. The flaps are arranged on or in the processing space in such a way that, in each region of the processing space, the air can be discharged. In this respect, flap zones may be defined, e.g., between two opposite flaps, between which the workpiece or the processing region is located.

A method according to the invention for suctioning air in a laser processing machine with a laser processing head which can be moved over a workpiece and with flaps to be opened selectively in order to generate an air flow comprises the detection of the position and the operating state of the laser processing head, the determination of a future position and the operating state of the laser processing head corresponding to this position on the basis of a processing plan in particular, a cutting plan, and the control of the flaps as a function of the operating state or of the position and the operating state. The same advantages and modifications apply as described above.

It may be provided that flaps already be opened, before the start of the processing, in the region of the processing to then be carried out and/or flaps be kept open, even after the processing has ended, in the region of the processing carried out. This leading or trailing control of the flaps optimizes the suction flow. It may be provided that flaps for the next processing step be opened at the same time so that several air flows are simultaneously controlled.

It may also be provided that flaps be controlled on the basis of a processing plan—in particular, a cutting plan. On the basis of the processing plan, the future processing locations and processing times are known, so that the suctioning is predictively controlled by the control of the flaps and, optionally, of a fan.

Further preferred embodiments of the invention ensue from the remaining features specified in the dependent claims.

The various embodiments of the invention mentioned in this application may be advantageously combined with one another, unless stated otherwise in individual cases.

BRIEF DESCRIPTION OF THE SEVERAL VIEWS OF THE DRAWINGS

The invention is explained below in exemplary embodiments with the aid of the associated drawings. The figures show.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
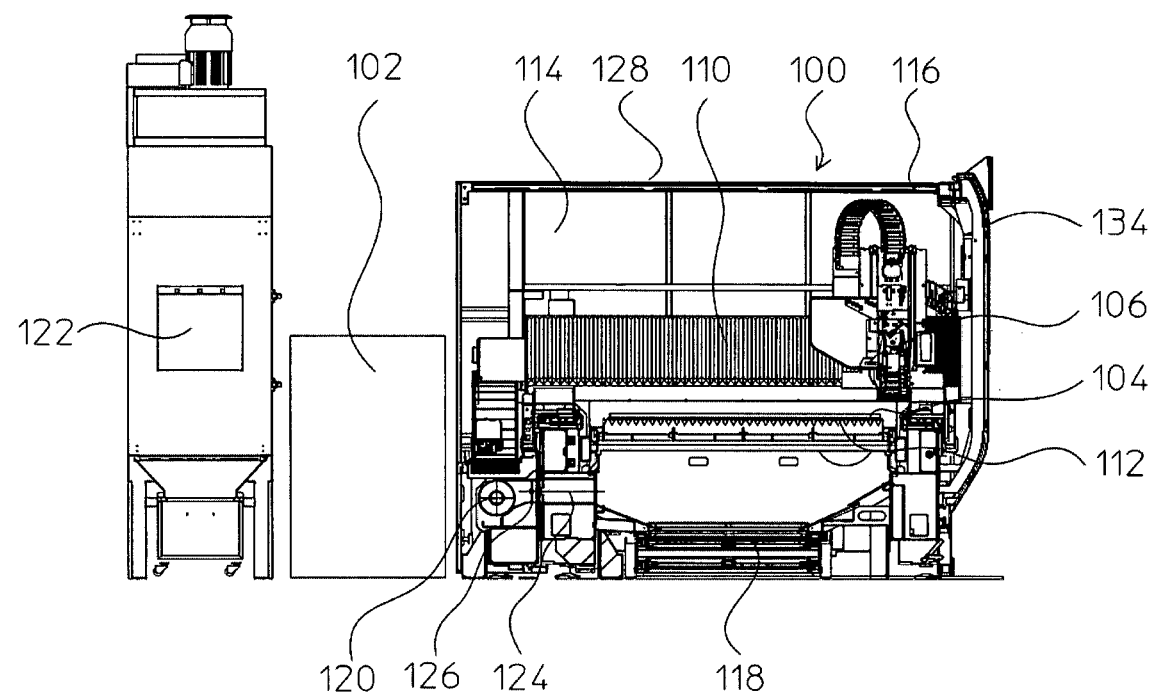
FIG. 1 a cross-section through a schematic representation of a laser processing machine.

FIG. 1 shows a schematic cross-sectional view of a laser processing machine 100. As laser processing machines 100 are considered here, in particular, laser processing machines for laser cutting and laser welding, in which a laser 102 can be moved over a workpiece 104 to be machined. Such laser processing machines 100 can machine 2-D/3-D workpieces, such as metal sheets or tubes. The laser 102 can be arranged directly in a laser processing head 106 or, in a stationary manner, in or next to the laser processing machine 100, wherein the laser beam is guided by the laser to the laser processing head 106 via a suitable optical waveguide.

The laser processing head 106 is arranged on a bridge 110, by means of which the laser processing head 106 can be moved in the x- and y-directions over the workpiece 104. The bridge 110 and the laser processing head 106, as well as the workpiece 104 which lies on a workpiece holder 112, are arranged in a processing space 114. The processing space 114 is enclosed by a housing 116 of the laser processing machine 100. The processing space 114 is defined by the extent of the workpiece holder 112 or the movement space of the bridge 110 or of the laser processing head 106.

The processing focus of the laser beam is usually in the sub-millimeter range up to a range of a few millimeters. In comparison, the extent of the processing space 104 is very large. The processing space 114 may extend over several meters both in the x-direction and in the y-direction. Thus, approximately a factor of 1,000 to 10,000 exists between the processing focus and the processing space 114. As a result, the laser processing head 106 must be moved relatively frequently and also over relatively long distances during processing.

During the thermal processing by the laser 102, smoke or air contaminated by particles develops. Coarse dirt is conveyed out of the laser processing machine 100 by a conveyor belt 118. The exhaust air is suctioned out of the laser processing machine 100 by a suction device 120.

The suction device 120 comprises a fan 122, which is pulling in this case and which communicates with the processing space 114 via an exhaust air duct 124. As shown, the fan may be arranged externally to the actual laser processing machine 100 or in the laser processing machine 100, e.g., at the position 120. In addition to the suction device 120, the position 120 may also denote an air collector or an air discharge.

A controllable flap 126 may fully close, partially close, or keep open the exhaust air duct 124. The flap 126 is controlled by a control (not shown here) of the suction device 120 or of the laser processing machine 100. As explained below with reference to FIG. 2, several flaps 126 are provided. It may be provided that a fan 122 be provided for all flaps 126. Alternatively, several fans 122 may be provided. Each flap 126 may thus have its own fan 122, or a group of flaps 126 is assigned to each fan 122.

Furthermore, air supply openings 128 are provided, which are likewise configured as controllable flaps or as non-controllable openings—for example, in the form of a labyrinth. The arrows show an exemplary air flow for suctioning off contaminated air. Pulled in by the fan 122, the air initially enters at the openings 128, flows further around the workpiece 104, or, in the case of openings in the workpiece 104, also through these openings, to an underside of the workpiece 104. There, the air flow enters the exhaust air duct 124 and is supplied by the fan 122 to a purification, such as a filter.

In the exemplary embodiment of the laser processing machine 100 illustrated in FIG. 1, the openings 128 are arranged above the workpiece 104 or at the top of the processing space 114. The flaps 126 are arranged below the workpiece 104 or at the bottom of the processing space 114. Of course, other arrangements are possible. For example, the openings and flaps may be located approximately at the height of the workpiece 104 or of the workpiece support 112. Air flow then takes place in the horizontal direction, while an air flow takes place in the vertical direction in the configuration shown in FIG. 1.

Figure 2:
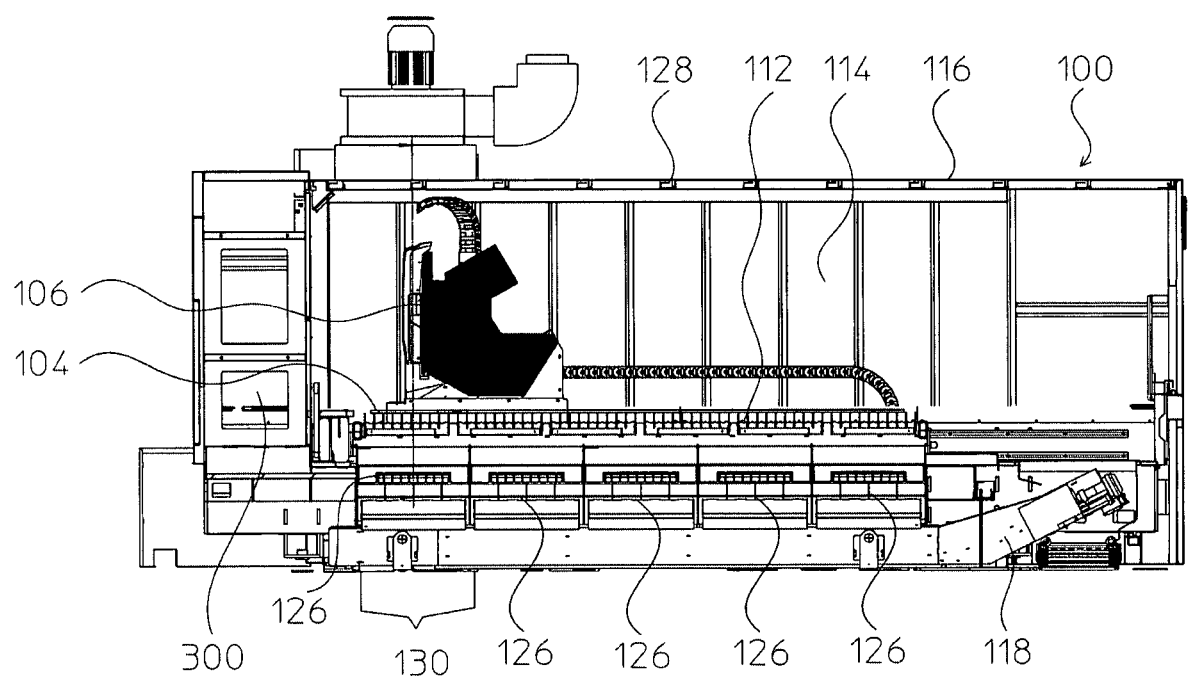
FIG. 2 a longitudinal section through a schematic representation of a laser processing machine.

FIG. 2 shows a longitudinal section of the laser processing machine 100. It can be seen that five flaps 126 are arranged along the processing space 114 in this exemplary embodiment. Depending upon the size of the processing space 114 or the desired distribution of the air flow, more or fewer flaps may be provided. The flaps 126 may be selectively controlled, i.e., opened and closed, by the controller.

Each flap 126 defines a suction zone 130 in which air is suctioned off when the flap 126 is open. In the illustration of FIG. 2, the two left flaps 126 are open. The left flap 126 is opened because the laser processing head 106 above the left flap 126 machines the workpiece 104. Thus, in the suction zone 130, the contaminated air resulting from the thermal processing is suctioned off directly. The second flap 126 from the left is already opened because the laser processing head 106 will travel to a future processing position above this flap 126. If the laser processing head 106 in this future processing position will take up the processing of the workpiece 104, the full volume flow for discharging the contaminated air is already built up there. Very good suction can be achieved with this predictive flap control.

In addition, one or more sensors 132 may be provided to detect the contamination of the air. Advantageously, one sensor is provided for each suction zone 130. Or one or more sensors are provided which can detect the contamination of the air in the respective suction zones over several suction zones. Via a protection door 134, an operator or robot can insert and remove the workpiece 104 or the workpiece support 112 with the workpiece 104.

Figure 3:
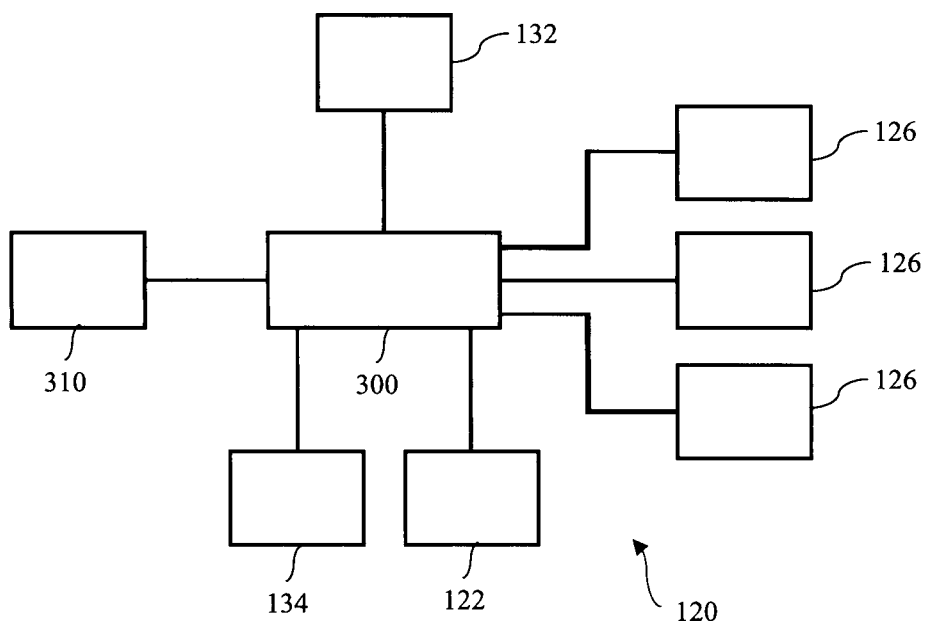
FIG. 3 a schematic representation of a suction device.

The suction device 120 is now described in more detail with reference to FIG. 3. The suction device 120 comprises a control 300 which is configured independently or as a component of the machine controller. As inputs, the control 300 receives sensor data from the sensor or sensors 132 and a cutting plan 310. From the cutting plan 310, the control 300 obtains the future positions and the respective operating state of the laser processing head 106 corresponding to the position.

From one of the two inputs or from both inputs, the control 300 has calculated when and where contaminated air must be discharged. Accordingly, one or more flaps 126 are controlled. The control 300 may fully or partially open and close each of the flaps 126.

In addition, the control 300 may control the fan or fans 122—more specifically, the fan power. Thus, when the flap or flaps 126 are not open, it is possible to completely switch off the fan 122 or put it into an energy-saving idling mode. Accordingly, the control 300 may increase the power of the fan in the case of a required volume flow. Lastly, the control 300 may delay opening the protection door 134 until the air in the processing space 114 has assumed a level of contamination harmless to the user.

In particular, the control 300 can already open flaps 126, before the start of the processing, in the region of the processing to then be carried out and/or keep flaps 126 open, even after the processing has ended, in the region of the processing carried out. The leading opening of the flaps 126 ensures that the required volume flow for suctioning the air is already completely present at the start of the processing. The trailing closing of the flaps 126 ensures that the required volume flow for suctioning the air is present after the processing has ended until all contaminations are suctioned off. The leading times and trailing times are calculated by the control 300 on the basis of machine data, such as the size of the processing space 114, the number of flaps 126, the strength of the laser, etc., and data from the cutting plan 310, such as material specifications, cutting duration, etc.

The control 300 may also use the sensor data for determining a maintenance state of the laser processing machine 100. Current sensor values and/or a history of the sensor values can be considered in this respect. Based upon the number of activations of the flaps 126 and of the fan or fans 122, conclusions may also be drawn about their maintenance state.

Figure 4:
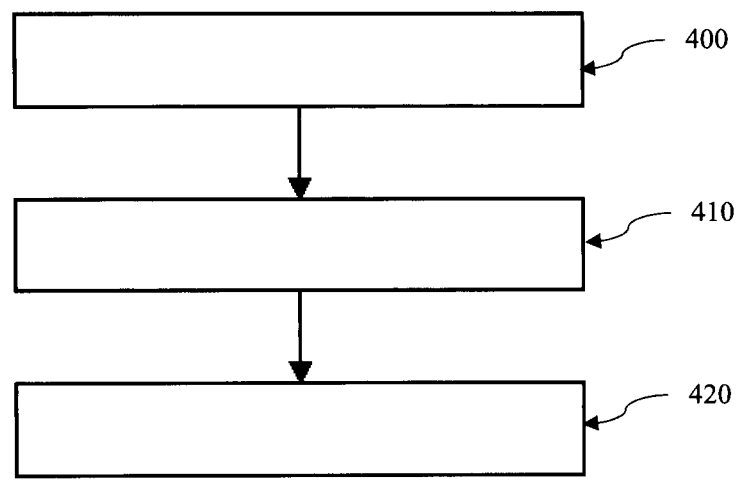
FIG. 4 a flow diagram of a method for suctioning air.

FIG. 4 describes a method for suctioning air in a laser processing machine with a laser processing head which can be moved over a workpiece and with flaps to be opened selectively in order to generate an air flow. For example, the method may run in the control 300.

In a first step 400, the position and the operating state of the laser processing head or of the laser are detected. In other words, it is detected where the laser processing head is located and whether it is moving or processing the workpiece. The position and the operating state can be detected at the current point in time, e.g., via sensors, and/or for future points in time, e.g., by means of a processing plan for machine control.

In a second step 410, the flaps are controlled as a function of the position and the operating state. Additional information, e.g., from sensors for local measurement of the air quality, can likewise be used for the control.

In a further step 420, which may be performed in parallel or subsequently to the second step 410, the suction volume of the fan is controlled as a function of the operating state and/or the sensor data.

The suction device 120 or laser processing machine 100 presented here allows efficient and complete suctioning of contaminated air in the case of spatially changing processing spaces and thus spatially changing contamination centers.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A laser processing machine with a laser processing head which is moved in a processing space over a workpiece holder, the laser processing machine comprising:
    at least one air supply opening for supplying air into a chamber,
    a fan and several flaps for exhausting air from the chamber which are to be opened selectively in order to generate an air flow and which are in communication with the fan,
    a control configured to detect a future position of the laser processing head and to control the flaps as a function of the detected position of the laser processing head, and
    wherein the control is configured to detect the operating state of the laser processing head and to control the flaps as a function of the future position and the operating state of the laser processing head corresponding to the future position, and wherein the flaps open before the start of the processing operating statem, in the region of the process operating state for an optimum air flow or a volume flow,
    wherein the control is further configured to determine a future position and the operating state of the laser processing head corresponding to this position on the basis of a processing plan, and
    wherein the processing space is further configured to receive a workpiece to be machined.

2. The laser processing machine according to claim 1, further comprising:
    at least one sensor configured to detect contamination of air in the processing space, and wherein the control is further configured to use sensor data of the sensor for controlling the flaps.

3. The laser processing machine according to claim 2, wherein the control is configured to control an opening of a protection door of the processing space as a function of the sensor data.

4. The laser processing machine according to claim 2 wherein the control is further configured to use the sensor data for determining a maintenance state of the laser processing machine.

5. The laser processing machine according to claim 2, wherein the control is further configured to control a suction volume of the fan as a function of the sensor data.

6. The laser processing machine according to claim 4, wherein the flaps are arranged in at least one of a lower region of the processing space, an upper region, and a central region.

7. The laser processing machine according to claim 1, wherein the laser processing machine is a laser cutting machine.

8. The laser processing machine according to claim 1, wherein the laser processing head is a laser cutting head.

* * * * *